(12) United States Patent
Sierra (10) Patent No.: US 8,061,761 B1
(45) Date of Patent: Nov. 22, 2011

(54) TAILGATE COVER

(76) Inventor: David Sierra, San Jose, CA (US)

( * ) Notice: Subject to any disclaimer, the term of this patent is extended or adjusted under 35 U.S.C. 154(b) by 189 days.

(21) Appl. No.: 12/472,142

(22) Filed: May 26, 2009

Related U.S. Application Data (60) Provisional application No. 61/130,268, filed on May 28, 2008.

(51) Int. Cl.
*B60J 7/20* (2006.01)

(52) U.S. Cl. .............................................. 296/136.01

(58) Field of Classification Search ............ 296/136.01, 296/100.04, 100.15, 50, 98, 165, 100.1, 39.2, 296/100.06, 100.18
See application file for complete search history.

(56) References Cited

U.S. PATENT DOCUMENTS

| | | | | |
|---|---|---|---|---|
| 2,405,517 A * | 8/1946 | Plummer | 206/162 |
| 3,701,210 A * | 10/1972 | Smith | 40/591 |
| 4,540,214 A * | 9/1985 | Wagner | 296/39.2 |
| 4,572,568 A * | 2/1986 | Kapp et al. | 296/39.2 |
| 4,707,016 A * | 11/1987 | McDonald | 296/39.2 |
| 4,877,281 A * | 10/1989 | Altmann | 296/39.1 |
| 4,900,204 A * | 2/1990 | Summers | 410/97 |
| 5,046,774 A * | 9/1991 | Stockell et al. | 296/38 |
| D323,639 S * | 2/1992 | Creamer | D12/401 |
| 5,169,201 A * | 12/1992 | Gower | 296/39.2 |
| D333,083 S * | 2/1993 | Stenger | D8/346 |
| 5,215,346 A * | 6/1993 | Reitzloff et al. | 296/51 |
| 5,255,464 A * | 10/1993 | Marecek | 40/591 |
| 5,372,397 A * | 12/1994 | Arndt | 296/39.2 |
| 5,538,307 A * | 7/1996 | Otis | 296/61 |
| 5,556,151 A * | 9/1996 | New et al. | 296/39.2 |
| 5,628,442 A * | 5/1997 | Wayne | 224/543 |
| D383,112 S * | 9/1997 | Patterson | D12/422 |
| 5,673,960 A * | 10/1997 | Sorensen | 296/136.07 |
| 5,820,189 A * | 10/1998 | Tew | 296/26.11 |
| 5,893,226 A * | 4/1999 | Sophocleous et al. | 40/591 |
| 5,954,382 A * | 9/1999 | Combs | 296/39.2 |
| RE36,345 E * | 10/1999 | Moore | 224/563 |
| 6,006,462 A * | 12/1999 | Lackomar | 40/593 |
| 6,116,676 A * | 9/2000 | Edwards | 296/64 |
| 6,206,445 B1 * | 3/2001 | Brooks | 296/51 |
| 6,226,912 B1 * | 5/2001 | Tackett et al. | 40/673 |
| 6,286,885 B1 * | 9/2001 | Ramos | 296/57.1 |
| 6,334,562 B1 * | 1/2002 | Ament et al. | 224/563 |
| 6,484,427 B1 * | 11/2002 | Santa Cruz et al. | 40/591 |
| 6,641,190 B2 * | 11/2003 | Kirchhoff | 296/26.11 |
| 6,722,542 B2 * | 4/2004 | McMurray et al. | 224/563 |
| 6,749,250 B1 * | 6/2004 | Reid | 296/136.07 |
| 6,789,833 B1 * | 9/2004 | Alber | 296/57.1 |
| 6,821,600 B1 * | 11/2004 | Henson | 428/99 |
| 6,945,584 B1 * | 9/2005 | Alber | 296/57.1 |
| 7,240,814 B2 * | 7/2007 | Holmberg | 224/275 |
| 7,241,093 B2 * | 7/2007 | Zuniga | 410/97 |
| 7,318,617 B1 * | 1/2008 | Scotton | 296/37.16 |
| 7,350,681 B2 * | 4/2008 | Polburn et al. | 224/275 |
| 7,513,557 B2 * | 4/2009 | Leigh-Monstevens | 296/64 |
| 7,513,726 B1 * | 4/2009 | Comiskey, Jr. | 410/32 |
| 2005/0028912 A1 * | 2/2005 | Schnarr | 150/166 |
| 2006/0090975 A1 * | 5/2006 | Brock et al. | 190/2 |
| 2008/0185861 A1 * | 8/2008 | Johnson | 296/26.11 |
| 2008/0203752 A1 * | 8/2008 | Warkentin | 296/57.1 |

* cited by examiner

*Primary Examiner* — Kiran B. Patel
(74) *Attorney, Agent, or Firm* — Haverstock & Owens (57) ABSTRACT

A tailgate cover includes at least one pocket to securely fit over a tailgate. In some embodiments, the tailgate cover includes two or three pockets. The tailgate cover is made of stretchable material such as a stretchable fabric which enables the cover to be stretched securely over the tailgate. To further secure the tailgate cover over the tailgate, any coupling device is able to be used. The tailgate cover is able to include any graphic and/or text.

16 Claims, 6 Drawing Sheets

TAILGATE COVER

RELATED APPLICATIONS

This patent application claims priority under 35 U.S.C. section 119(e) to the U.S. Provisional Patent Application Ser. No. 61/130,268, filed May 28, 2008 and entitled "TAILGATE COVER," which is hereby incorporated by reference.

FIELD OF THE INVENTION

The present invention relates to the field of vehicle coverings. More specifically, the present invention relates to the field of tailgate covers.

BACKGROUND OF THE INVENTION

Avid fans do anything to show their pride in their team including wearing clothes, buying trinkets, placing bumper stickers on vehicles and fastening flags onto their vehicles, all with team logos. Furthermore, people are continuously looking for ways of advertising, such as putting signs atop taxicabs, placing ads on the sides of buses and affixing stickers to vehicles.

SUMMARY OF THE INVENTION

A tailgate cover includes at least one pocket to securely fit over a tailgate. In some embodiments, the tailgate cover includes two or three pockets. The tailgate cover is made of stretchable material such as a stretchable fabric which enables the cover to be stretched securely over the tailgate. To further secure the tailgate cover over the tailgate, any coupling device is able to be used. The tailgate cover is able to include any graphic and/or text.

In one aspect, a tailgate cover for the tailgate of a vehicle comprises a first section and a second section, wherein the first section is on an outer side of the tailgate for viewing and the second section is slid through a gap between the tailgate and a bed of the truck such that the second section is on an inner side of the tailgate within the bed area of the truck. In some embodiments, the tailgate cover further comprises a pocket which is coupled to or an extension of the first section such that the pocket is fit over the top of the tailgate when the tailgate cover is fit onto the tailgate. In these embodiments, the tailgate cover further comprises a coupling device which is attached to the first and the second section of the tailgate cover and the second section is pulled towards the pocket, wherein the two sections are secured by the coupling device. In these embodiments, the coupling device is one or more of a hook and loop fastening system, a zipper, grommets, rope through loops, hooks through holes, magnets, straps, clips, belts, snaps, bars, sheaths or any combination thereof. In some embodiments, the first section of the tailgate cover displays a team logo, advertisement or other graphics and/or text. In these embodiments, the display is placed on the tailgate cover by one or more of sewing, printing, adhesive and etching.

In some embodiments, the tailgate cover further comprises a slit included in the first section and positioned on the tailgate where the handle is for access to the handle. In some embodiments, the tailgate cover is configured to fit on the tailgate of a truck.

In some embodiments, the tailgate cover further comprises flaps which help maintain a secure fit of the tailgate cover on the tailgate. In some embodiments, the tailgate cover is stretchable or at least includes a stretchable portion. In other embodiments, the tailgate cover further comprises a safety cable with a fastener coupled to the tailgate cover that is used to couple the tailgate cover to a part of the vehicle. In some of these embodiments, the fastener of the safety cable is a lock such that the safety cable is able to prevent others from stealing the tailgate cover by locking the tailgate cover to the vehicle. In some embodiments the safety cable comprises one or more of rope, bungee cord, wire cabling or plastic cabling. In other embodiments, the safety cable is a feeder strip that is used to help pull the second section through the gap between the tailgate and the bed of the vehicle.

In another aspect, a tailgate cover for a vehicle comprises a first section, a second section, wherein the first section is on an outer side of the tailgate for viewing and the second section is slid through a gap between the tailgate and a bed of the truck such that the second section is on an inner side of the tailgate within the bed area of the truck, a first pocket that fits over the top of the tailgate, wherein the first pocket is coupled to or is an extension of the first section and a second pocket. In some embodiments, the second pocket is coupled to or is an extension of the second section and fits on the bottom of the tailgate. In this embodiment, on each of the first section and the second section and/or the first pocket is a coupling device for securing the tailgate cover on the tailgate. In some embodiments, the second pocket is coupled to or is an extension of the second section and sits on top of or underneath the first pocket at the top of the tailgate. In other embodiments, the tailgate cover further comprises a third pocket. In these embodiments, the second pocket fits over the bottom of the tailgate and the third pocket fits on top of or underneath the first pocket at the top of the tailgate and the second pocket is coupled to or is an extension of the first section at the opposite end of the first section from the first pocket and the third pocket is coupled to or is an extension of the second section.

In some embodiments, the tailgate cover is stretchable or at least includes a stretchable portion. In some embodiments, the first section displays a team logo, advertisement or other graphics and/or text. In these embodiments, the display is placed on the tailgate cover by one or more of sewing, printing, adhesive and etching. In other embodiments, the tailgate cover further comprises a slit included in the first section and positioned on the tailgate where the handle is for access to the handle. In some embodiments, the tailgate cover is configured to fit on the tailgate of a truck.

Another aspect relates to a method of securing a tailgate cover to a tailgate. In this aspect, the method comprises the steps of securing a first pocket of the tailgate cover on top of the tailgate and sliding a second section of the tailgate cover through a gap between the tailgate and a bed of the truck. The first pocket is secured to the top of the tailgate by stretching the pocket to cover the top of the tailgate and the second section of the tailgate cover is secured such that the tailgate cover securely fits on the tailgate thereby protecting the tailgate and displaying a team logo, advertisement or other graphics and/or text. In these embodiments, the display is placed on the tailgate cover by one or more of sewing, printing, adhesive and etching. In some embodiments, the tailgate cover further comprises a coupling device for coupling the second section to the first pocket, wherein the second section is pulled towards the first pocket and the device is secured together.

In some embodiments, the method further comprises sliding a second pocket through the gap between the tailgate and the bed of the truck. In some of these embodiments, the second pocket is opposite the first pocket and the second pocket is secured at the bottom of the tailgate by stretching the pocket to cover the bottom of the tailgate. Where the second pocket is opposite the first pocket and the second pocket is secured at the bottom of the tailgate, a third pocket is also able to be slid through the gap between the tailgate and the bed of the truck. In these embodiments, the third pocket is at the end of the second section and third pocket is stretched over the top or underneath the first pocket at the top of the tailgate. In other embodiments, the second pocket is slid through the gap between the tailgate and the bed of the truck, wherein the second pocket is at the end of the second section and is stretched over the top of or underneath the first pocket.

DETAILED DESCRIPTION OF THE PREFERRED EMBODIMENT

Figure 1A:
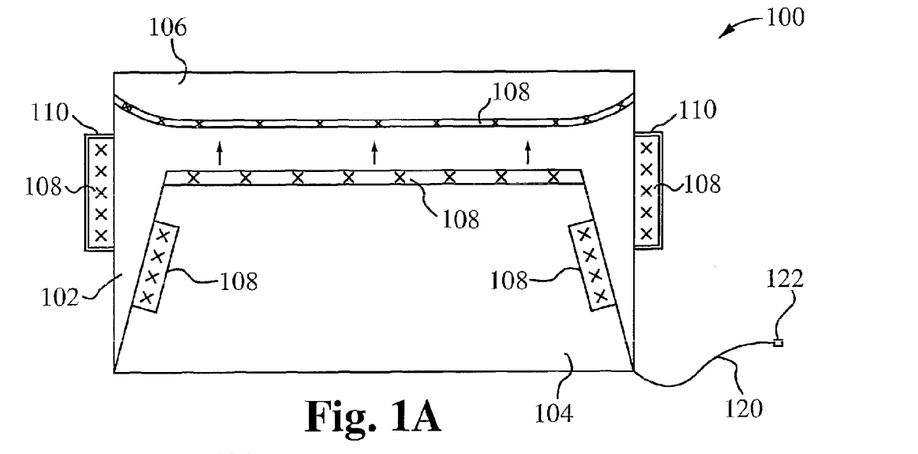
FIG. 1A illustrates a rear view of an embodiment of a tailgate cover for a tailgate of a truck in accordance with the present invention.

FIG. 1A illustrates a rear view of a tailgate cover 100 for a tailgate of a truck. The tailgate cover 100 includes a first section 102 and a second section 104 such that the first section 102 is on the outer side of the tailgate for viewing, and the second section 104 is on the inner side of the tailgate within the bed area of a truck. In some embodiments, the first section 102 is the inner side and the second section 104 is the outer side. The tailgate cover 100 also includes a pocket 106 which fits over the top of a tailgate. The pocket 106 is coupled to or is an extension of the first section 102. On each of the first section 102, the second section 104 and/or the pocket 106 is a coupling device 108 for securing the tailgate cover 100 on the tailgate. For example, FIG. 1 shows the lip of the pocket 106 with the coupling device 108 and the lip of the second section 104 with the coupling device 108. The second section 104 is pulled towards the pocket 106 and the two are secured together with the coupling device 108. The coupling device 108 includes, but is not limited to, a hook and loop fabric, a zipper, grommets, rope through loops, hooks through holes, magnets, straps, clips, belts, snaps, bars, sheaths, combinations of devices or any other device for coupling pieces of material. In some embodiments, side flaps 110 are also included which help maintain a secure fit. In some embodiments, the side flaps 110 are not included. In embodiments with the side flaps 110, the side flaps 110 include the coupling device 108, and the second section 104 includes a corresponding coupling device 108. For example, as shown in FIG. 1, the side flaps 110 couple to the second section 104 with the coupling device 108.

The material of the tailgate cover 100 is stretchable or at least includes a stretchable portion. In some embodiments, the entire tailgate cover 100 is stretchable. In some embodiments, the pocket 106 is stretchable, and part of the first section 102 and part of the second section 104 is stretchable. Examples of stretchable materials include, but are not limited to stretchable fabric, elastomers, soft stretchable plastics or rubber. The material is stretchable such that the pocket 106 is able to securely stretch over and remain on the top of the tailgate. In some embodiments, the first section 102 and the second section 104 are smaller than the tailgate when unstretched, but when stretched, the first section 102 and the second section 104 are able to expand and cover the tailgate. For example, the distance around a tailgate is 5 feet, and the first section 102 and second section 104 combined are 4 feet when unstretched but are able to be stretched to the full 5 feet. In some embodiments, the pocket 106 is smaller than the tailgate when unstretched but when stretched the pocket 106 is able to expand around the tailgate. This expansion and then contraction around the tailgate enables the first section 102, the second section 104 and the pocket 106 to obtain a very secure and tight fit on the tailgate. In some embodiments, the tailgate cover 100 is one-size-fits-all for all trucks, and in some embodiments, the tailgate cover 100 is manufactured in different sizes such as for small, medium and large trucks.

In some embodiments, a safety cable 120 with a fastener 122 is coupled to the tailgate cover 100. The safety cable 120 is used to couple the tailgate cover 100 to a part of the truck in the event that the tailgate cover 100 somehow becomes loose from the tailgate. The safety cable 120 is securely fastened to the truck. The safety cable 120 is able to couple to the tailgate cover 100 anywhere to the truck using the fastener 122. For example, some trucks have loops in the bed to receive hooks. The fastener 122 is able to be any type of fastener or coupling mechanism such as a hook, a clasp, a lock, a magnet, a clip, a hook and loop fabric or anything else to ensure the tailgate cover 100 does not get lost. The safety cable 120 is able to be any type of material strong enough not to break if the tailgate cover 100 is pulled by the wind. Possible materials of the safety cable 120 include, but are not limited to, rope, bungee cord, wire cabling or plastic cabling. In some embodiments, the safety cable 120 does not include a fastener 122. For example, the safety cable 120 is simply rope which is tied to the truck. In some embodiments, the safety cable 120 is detachable from the tailgate cover 100 for those who do not want to use the safety cable 120. In embodiments where the fastener 122 is a lock (e.g. combination, key or other), the safety cable 120 is able to prevent others from stealing the tailgate cover 100 by locking to the truck. Although the safety cable 120 is only shown in FIG. 1A to prevent cluttering of the drawings, the safety cable 120 is able to be included in any of the embodiments.

In some embodiments, instead of or in addition to the safety cable 120 being used to prevent the tailgate cover 100 from being lost, the safety cable 120 is used as a feeder strip to help pull the second section 104 through the gap between the tailgate and the bed of the truck. For example, part of the safety cable 120 is fed through the gap from within the bed area of the truck. The safety cable 120 is then coupled to the second section 104 of the tailgate cover 100. The coupling depends on the configuration of the fastener 122 of the safety cable 120 and/or the coupling device 108 of the second section 104. For example, if the fastener 122 is one side of a hook and loop fabric (e.g. hooks), and the coupling device 108 is the other side of the hook and loop fabric (e.g. loops), the fastener 122 is able to couple to the second section 104 by coupling the hooks and loops together. Any implementation of coupling the safety cable 120 to the second section 104 is possible. Once the safety cable 120 is coupled to the second section 104, they are both pulled back through the gap between the tailgate and the bed. Then, the safety cable 120 is able to be removed, and if desired, used as a safety cable 120 as described above to prevent losing the tailgate cover 100.

Figure 1B:
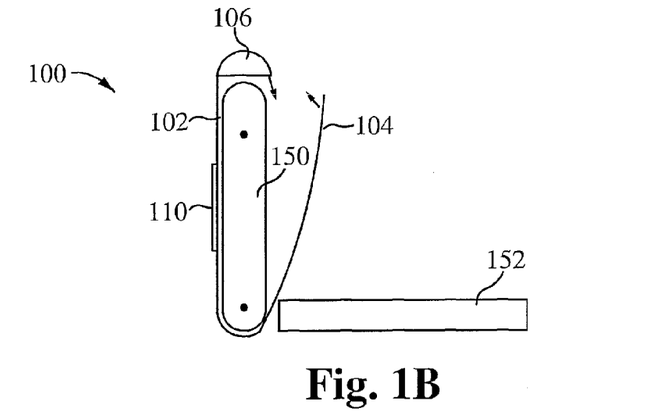
FIG. 1B illustrates a side view of an embodiment of a tailgate cover positioned to be secured to a tailgate of a truck in accordance with the present invention.

FIG. 1B illustrates a side view of the tailgate cover 100 positioned to be secured to a tailgate 150 of a truck. The pocket 106 is positioned on the top of the tailgate 150. In some embodiments, the pocket 106 is made of an elastic or other stretchable material that stretches over the tailgate 150 and securely remains over the tailgate 150 due to the elastic compression on the tailgate 150. The second section 104 is fed through a gap between the tailgate 150 and the bed 152 of the truck. Once through the gap, the second section 104 is on the inner side of the tailgate 150, inner being the inside of the truck, not the actual inside of the tailgate 150. The first section 102 is positioned on the outer side of the tailgate 150 for display of the graphics and/or text on the tailgate cover 100. The display is placed on the tailgate cover by one or more of sewing, printing, adhesive and etching. To secure the tailgate cover 100 on the tailgate 150 further, the second section 104 is then pulled upwards and towards the pocket 106 to couple the coupling device 108 (FIG. 1). The elastic/stretchable material of the tailgate cover 100 ensures a tight fit around the tailgate 150. To secure the tailgate cover 100 even further, the side flaps 110, when included, are able to be secured to the second section 104 around the side of the tailgate 150. For some trucks, the tailgate 150 must be in the down/open position for the tailgate cover 100 to be positioned on the tailgate 150 and/or the side flaps 110 to be secured.

Figure 1C:
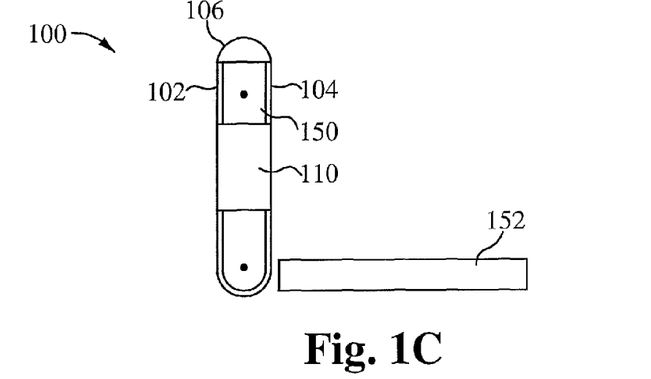
FIG. 1C illustrates a side view of an embodiment of a tailgate cover secured to a tailgate of a truck in accordance with the present invention.

FIG. 1C illustrates a side view of the tailgate cover 100 secured to the tailgate 150 of the truck. The pocket 106 is securely positioned on the top of the tailgate 150. The second section 104 is secured to the pocket 106 using the coupling device 108. The side flaps 110 are secured to the second section 104 using the coupling device 108. The first side 102, the second side 104, the pocket 106 and the side flaps 110 are tightly positioned against the tailgate 150 due to the elastic nature of the material of the tailgate cover 100. With the tailgate cover 100 secured in place, the front section 102 displays the graphics and/or text of the cover 100.

Figure 2A:
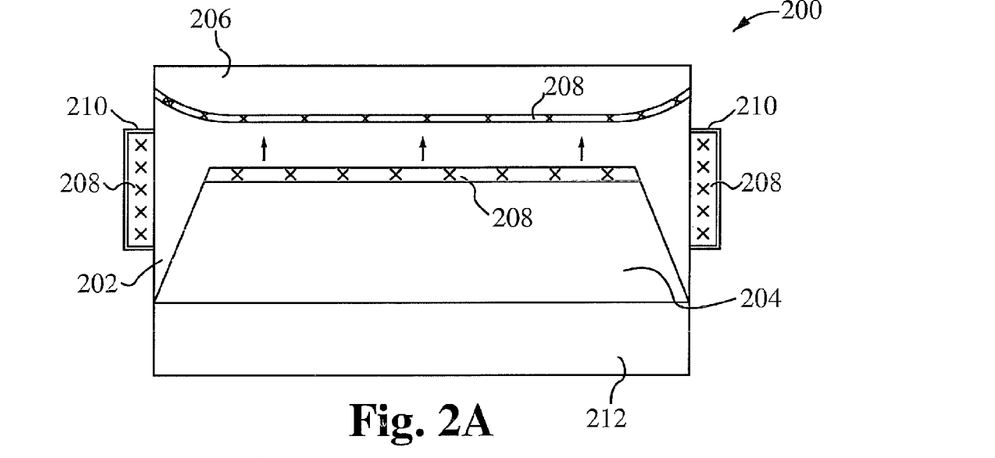
FIG. 2A illustrates a rear view of an embodiment of a tailgate cover for a tailgate of a truck in accordance with the present invention.

FIG. 2A illustrates a rear view of a tailgate cover 200 for a tailgate of a truck. The tailgate cover 200 includes a first section 202 and a second section 204 such that the first section 202 is on the outer side of the tailgate for viewing, and the second section 204 is on the inner side of the tailgate within the bed area of a truck. In some embodiments, the first section 202 is the inner side and the second section 204 is the outer side. The tailgate cover 200 also includes a first pocket 206 which fits over the top of a tailgate and a second pocket 212 which fits on the bottom of the tailgate. The first pocket 206 is coupled to or is an extension of the first section 202. The second pocket 212 is coupled to or is an extension of the first section 202 at an opposing end of the first pocket 206. The second section 204 is coupled to or is an extension of the second pocket 212. On each of the first section 202, the second section 204 and/or the first pocket 206 is a coupling device 208 for securing the tailgate cover 200 on the tailgate. For example, FIG. 2 shows the lip of the first pocket 206 with the coupling device 208 and the lip of the second section 204 with the coupling device 208. The second section 204 is pulled towards the first pocket 206 and the two are secured together with the coupling device 208. The coupling device 208 includes, but is not limited to, a hook and loop fabric, a zipper, grommets, rope through loops, hooks through holes, magnets, straps, clips, belts, snaps, bars, sheaths, combinations of devices or any other device for coupling pieces of material. In some embodiments, side flaps 210 are also included which help maintain a secure fit. In some embodiments, the side flaps 210 are not included. In embodiments with the side flaps 210, the side flaps 210 include the coupling device 208, and the second section 204 includes a corresponding coupling device 208. For example, as shown in FIG. 1, the side flaps 210 couple to the second section 204 with the coupling device 208.

The material of the tailgate cover 200 is stretchable or at least includes a stretchable portion. In some embodiments, the entire tailgate cover 200 is stretchable. In some embodiments, the first pocket 206 and the second pocket 212 are stretchable and part of the first section 202 and part of the second section 204 is stretchable. Examples of stretchable materials include, but are not limited to stretchable fabric, elastomers, soft stretchable plastics or rubber. The material is stretchable such that the first pocket 206 and the second pocket 212 are able to securely stretch over and remain on the tailgate. In some embodiments the first section 202 and the second section 204 are smaller than the tailgate when unstretched, but when stretched, the first section 202 and the second section 204 are able to expand and cover the tailgate. For example, the distance around a tailgate is 5 feet, and the first section 202 and second section 204 combined are 4 feet when unstretched but are able to be stretched to the full 5 feet. In some embodiments, the first pocket 206 and the second pocket 212 are smaller than the tailgate when unstretched but when stretched the first pocket 206 and the second pocket 212 are able to expand around the tailgate. This expansion and then contraction around the tailgate enables the first section 202, the second section 204, the first pocket 206 and the second pocket 212 to obtain a very secure and tight fit on the tailgate. In some embodiments, the tailgate cover 200 is one-size-fits-all for all trucks, and in some embodiments, the tailgate cover 200 is manufactured in different sizes such as for small, medium and large trucks.

Figure 2B:
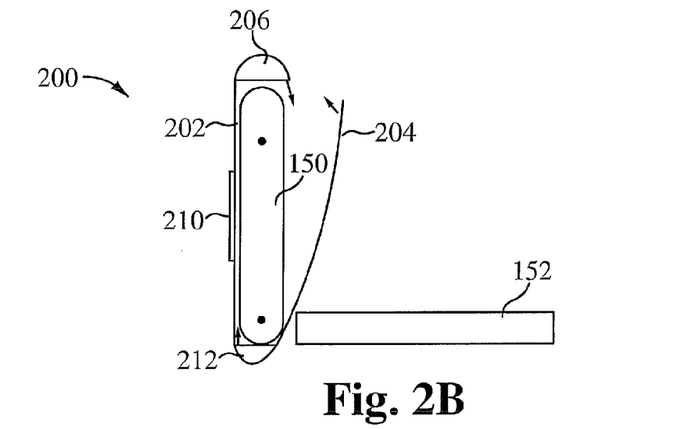
FIG. 2B illustrates a side view of an embodiment of a tailgate cover positioned to be secured to a tailgate of a truck in accordance with the present invention.

FIG. 2B illustrates a side view of the tailgate cover 200 positioned to be secured to a tailgate 150 of a truck. The first pocket 206 is positioned on the top of the tailgate 150, and the second pocket 212 is positioned at the opposite end (e.g. the bottom) of the tailgate 150. In some embodiments, the first pocket 206 and the second pocket 212 are made of an elastic or other stretchable material that stretches over the tailgate 150 and securely remains over the tailgate 150 due to the elastic compression on the tailgate 150. The second section 204 is fed through a gap between the tailgate 150 and the bed 152 of the truck. Once through the gap, the second section 204 is on the inner side of the tailgate 150, inner being the inside of the truck, not the actual inside of the tailgate 150. The first section 202 is positioned on the outer side of the tailgate 150 for display of the graphics and/or text on the tailgate cover 200. The display is placed on the tailgate cover by one or more of sewing, printing, adhesive and etching. To secure the tailgate cover 200 on the tailgate 150 further, the second section 204 is then pulled upwards and towards the first pocket 206 to couple the coupling device 208 (FIG. 1). The elastic/stretchable material of the tailgate cover 200 ensures a tight fit around the tailgate 150. To secure the tailgate cover 200 even further, the side flaps 210, when included, are able to be secured to the second section 204 around the side of the tailgate 150. For some trucks, the tailgate 150 must be in the down/open position for the tailgate cover 200 to be positioned on the tailgate 150 and/or the side flaps 210 to be secured.

Figure 2C:
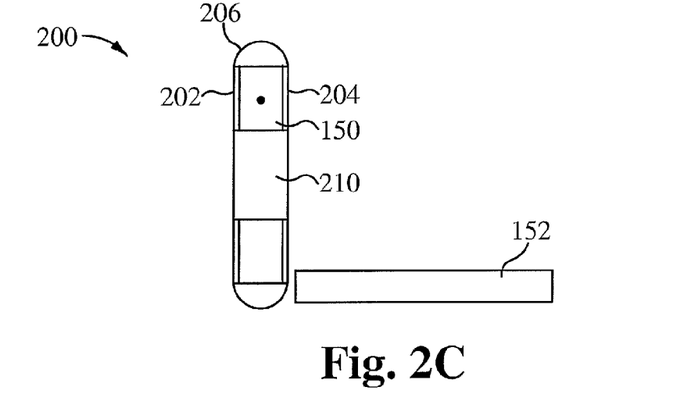
FIG. 2C illustrates a side view of an embodiment of a tailgate cover secured to a tailgate of a truck in accordance with the present invention.

FIG. 2C illustrates a side view of the tailgate cover 200 secured to the tailgate 150 of the truck. The first pocket 206 is securely positioned on the top of the tailgate 150, and the second pocket 212 is securely positioned on the opposite side (e.g. bottom) of the tailgate 150. The second section 204 is secured to the first pocket 206 using the coupling device 208. The side flaps 210 are secured to the second section 204 using the coupling device 208. The first side 202, the second side 204, the first pocket 206, the second pocket 212 and the side flaps 210 are tightly positioned against the tailgate 150 due to the stretchable nature of the material of the tailgate cover 200. With the tailgate cover 200 secured in place, the front section 202 displays the graphics and/or text of the cover 200. The display is placed on the tailgate cover by one or more of sewing, printing, adhesive and etching.

Figure 3A:
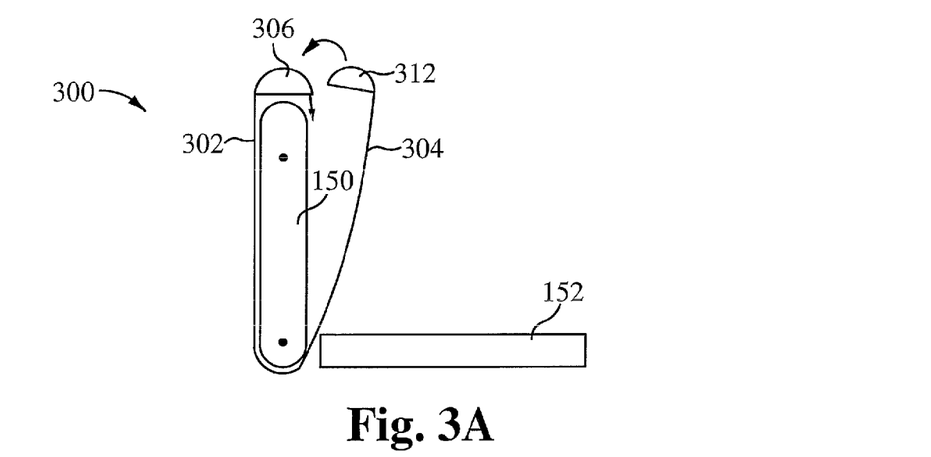
FIG. 3A illustrates a side view of an embodiment of a tailgate cover positioned to be secured to a tailgate of a truck in accordance with the present invention.

FIG. 3A illustrates a side view of a tailgate cover 300 for the tailgate 150 of a truck. The tailgate cover 300 includes a first section 302 and a second section 304 such that the first section 302 is on the outer side of the tailgate 150 for viewing, and the second section 304 is on the inner side of the tailgate 150 within the bed area of a truck. In some embodiments, the first section 302 is the inner side and the second section 304 is the outer side. The tailgate cover 300 also includes a first pocket 306 which fits over the top of the tailgate 150 and a second pocket 312 which fits on top of or underneath the first pocket 306 at the top of the tailgate. The first pocket 306 is coupled to or is an extension of the first section 302. The second pocket 312 is coupled to or is an extension of the second section 304. The second pocket 312 removes the need for the coupling device of FIGS. 1 and 2. However, for added security, the coupling device is able to be included located in positions similar to those shown for FIGS. 1 and 2. Furthermore, in some embodiments side flaps are also able to be included.

The material of the tailgate cover 300 is stretchable or at least includes a stretchable portion. In some embodiments, the entire tailgate cover 300 is stretchable. In some embodiments, the first pocket 306 and the second pocket 312 are stretchable and part of the first section 302 and part of the second section 304 is stretchable. Examples of stretchable materials include, but are not limited to stretchable fabric, elastomers, soft stretchable plastics or rubber. The material is stretchable such that the first pocket 306 and the second pocket 312 are able to securely stretch over and remain on the top of the tailgate. In some embodiments the first section 302 and the second section 304 are smaller than the tailgate when unstretched, but when stretched, the first section 302 and the second section 304 are able to expand and cover the tailgate. For example, the distance around a tailgate is 5 feet, and the first section 302 and second section 304 combined are 4 feet when unstretched but are able to be stretched to the full 5 feet. In some embodiments, the first pocket 306 and the second pocket 312 are smaller than the tailgate when unstretched but when stretched the first pocket 306 and the second pocket 312 are able to expand around the tailgate and/or each other. This expansion and then contraction around the tailgate enables the first section 302, the second section 304, the first pocket 306 and the second pocket 312 to obtain a very secure and tight fit on the tailgate. In some embodiments, the tailgate cover 300 is one-size-fits-all for all trucks, and in some embodiments, the tailgate cover 300 is manufactured in different sizes such as for small, medium and large trucks.

In some embodiments, the first pocket 306 and the second pocket 312 are made of an elastic or other stretchable material that stretches over the tailgate 150 and securely remains over the tailgate 150 due to the elastic compression on the tailgate 150. The second pocket 312 and the second section 304 are fed through a gap between the tailgate 150 and the bed 152 of the truck. The second pocket 312 is made of material thin enough and is configurable to fit through the gap. Once through the gap, the second section 304 is on the inner side of the tailgate 150, inner being the inside of the truck, not the actual inside of the tailgate 150. The first section 302 is positioned on the outer side of the tailgate 150 for display of the graphics and/or text on the tailgate cover 300. The display is placed on the tailgate cover by one or more of sewing, printing, adhesive and etching. To secure the tailgate cover 300 on the tailgate 150 further, the second pocket 312 is then pulled upwards and towards the first pocket 306 and covers the first pocket 306. In some embodiments, the second pocket 312 is secured on the tailgate 150 and the first pocket 306 then goes over the second pocket 312. The elastic/stretchable material of the tailgate cover 300 ensures a tight fit around the tailgate 150. For some trucks, the tailgate 150 must be in the down/open position for the tailgate cover 300 to be positioned on the tailgate 150.

Figure 3B:
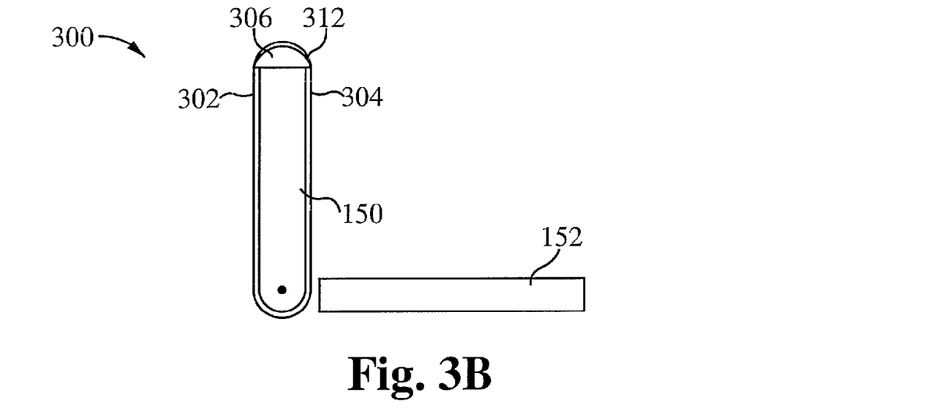
FIG. 3B illustrates a side view of an embodiment of a tailgate cover secured to a tailgate of a truck in accordance with the present invention.

FIG. 3B illustrates a side view of the tailgate cover 300 secured to the tailgate 150 of the truck. The first pocket 306 is securely positioned on the top of the tailgate 150, and the second pocket 312 is securely positioned over the first pocket 306. The first side 302, the second side 304, the first pocket 306 and the second pocket 312 are tightly positioned against the tailgate 150 due to the elastic nature of the material of the tailgate cover 300. With the tailgate cover 300 secured in place, the front section 302 displays the graphics and/or text of the cover 300. The display is placed on the tailgate cover by one or more of sewing, printing, adhesive and etching.

Figure 4A:
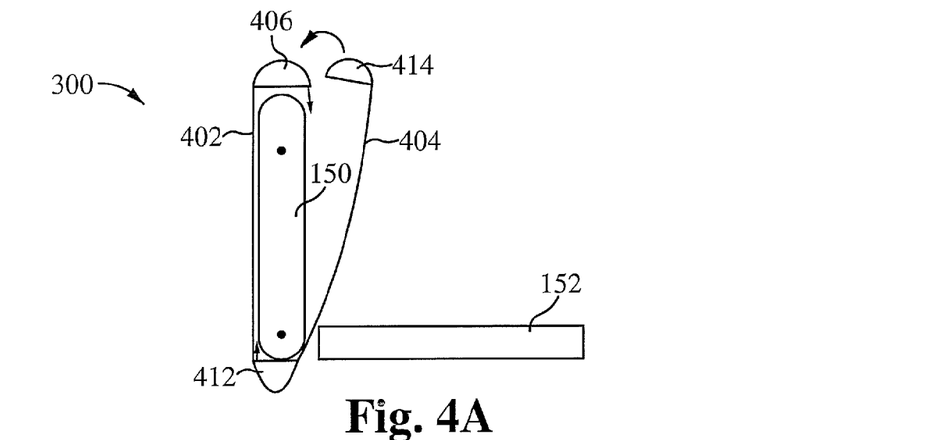
FIG. 4A illustrates a side view of an embodiment of a tailgate cover positioned to be secured to a tailgate of a truck in accordance with the present invention.

FIG. 4A illustrates a side view of a tailgate cover 400 for the tailgate 150 of a truck. The tailgate cover 400 includes a first section 402 and a second section 404 such that the first section 402 is on the outer side of the tailgate 150 for viewing, and the second section 404 is on the inner side of the tailgate 150 within the bed area of a truck. In some embodiments, the first section 402 is the inner side and the second section 404 is the outer side. The tailgate cover 400 also includes a first pocket 406 which fits over the top of the tailgate 150, a second pocket 412 which fits over the bottom of the tailgate 150 and a third pocket 414 which fits on top of or underneath the first pocket 406 at the top of the tailgate. The first pocket 406 is coupled to or is an extension of the first section 402. The second pocket 412 is coupled to or is an extension of the first section 402 at the opposite end of the first section 402 from the first pocket 406. The third pocket 414 is coupled to or is an extension of the second section 414. The second pocket 412 and the third pocket 414 remove the need for the coupling device of FIGS. 1 and 2. However, for added security, the coupling device is able to be included located in positions similar to those shown for FIGS. 1 and 2. Furthermore, in some embodiments side flaps are also able to be included.

The material of the tailgate cover 400 is stretchable or at least includes a stretchable portion. In some embodiments, the entire tailgate cover 400 is stretchable. In some embodiments, the first pocket 406, the second pocket 412 and the third pocket 414 are stretchable, and part of the first section 402 and part of the second section 404 is stretchable. Examples of stretchable materials include, but are not limited to stretchable fabric, elastomers, soft stretchable plastics or rubber. The material is stretchable such that the first pocket 406, the second pocket 412 and the third pocket 414 are able to securely stretch over and remain on the tailgate. In some embodiments the first section 402 and the second section 404 are smaller than the tailgate when unstretched, but when stretched, the first section 402 and the second section 404 are able to expand and cover the tailgate. For example, the distance around a tailgate is 5 feet, and the first section 402 and second section 404 combined are 4 feet when unstretched but are able to be stretched to the full 5 feet. In some embodiments, the first pocket 406, the second pocket 412 and the third pocket 414 are smaller than the tailgate when unstretched but when stretched the first pocket 406, the second pocket 412 and the third pocket 414 are able to expand around the tailgate and/or each other with respect to the first pocket 406 and the second pocket 412. This expansion and then contraction around the tailgate enables the first section 402, the second section 404, the first pocket 406, the second pocket 412 and the third pocket 414 to obtain a very secure and tight fit on the tailgate. In some embodiments, the tailgate cover 400 is one-size-fits-all for all trucks, and in some embodiments, the tailgate cover 400 is manufactured in different sizes such as for small, medium and large trucks.

In some embodiments, the first pocket 406, the second pocket 412 and the third pocket 414 are made of an elastic or other stretchable material that stretches over the tailgate 150 and securely remains over the tailgate 150 due to the elastic compression on the tailgate 150. The third pocket 414 and the second section 404 are fed through a gap between the tailgate 150 and the bed 152 of the truck. The third pocket 414 is made of material thin enough and is configurable to fit through the gap. Once through the gap, the second section 404 is on the inner side of the tailgate 150, inner being the inside of the truck, not the actual inside of the tailgate 150. The first section 402 is positioned on the outer side of the tailgate 150 for display of the graphics and/or text on the tailgate cover 400. The display is placed on the tailgate cover by one or more of sewing, printing, adhesive and etching. To secure the tailgate cover 400 on the tailgate 150 further, the third pocket 414 is then pulled upwards and towards the first pocket 406 and covers the first pocket 406. In some embodiments, the third pocket 414 is secured on the tailgate 150 and the first pocket 406 then goes over the third pocket 414. The elastic/stretchable material of the tailgate cover 400 ensures a tight fit around the tailgate 150. For some trucks, the tailgate 150 must be in the down/open position for the tailgate cover 400 to be positioned on the tailgate 150.

Figure 4B:
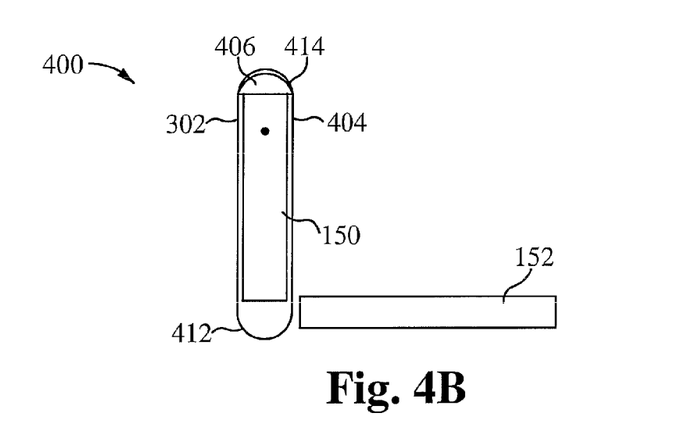
FIG. 4B illustrates a side view of an embodiment of a tailgate cover secured to a tailgate of a truck in accordance with the present invention.

FIG. 4B illustrates a side view of the tailgate cover 400 secured to the tailgate 150 of the truck. The first pocket 406 is securely positioned on the top of the tailgate 150. The second pocket 412 is securely positioned over the opposite end (e.g. the bottom) of the tailgate 150. The third pocket 414 is securely positioned over the first pocket 406. The first side 402, the second side 404, the first pocket 406, the second pocket 412 and the third pocket 414 are tightly positioned against the tailgate 150 due to the elastic nature of the material of the tailgate cover 400. With the tailgate cover 400 secured in place, the front section 402 displays the graphics and/or text of the cover 400. The display is placed on the tailgate cover by one or more of sewing, printing, adhesive and etching.

Figure 5:
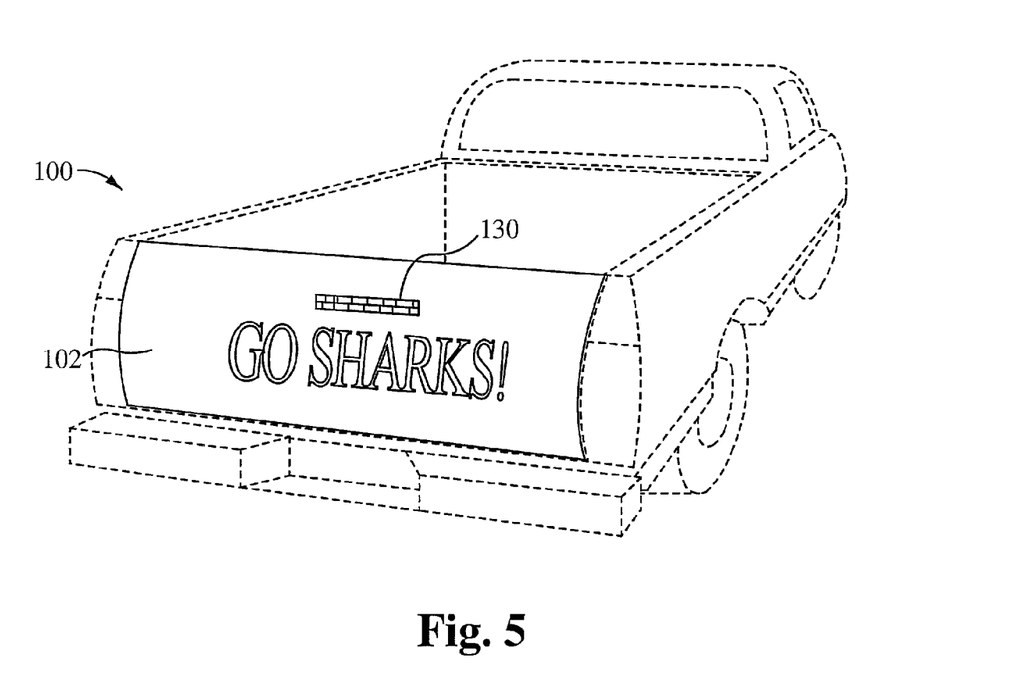
FIG. 5 illustrates a front view of the tailgate cover secured on a tailgate of a truck in accordance with the present invention.

FIG. 5 illustrates a front view of the tailgate cover 100 secured in place. With the tailgate cover 100 secured in place, the first section 102 is visible to those behind the truck. In some embodiments, a slit 130 is included in the first section 102. The slit 130 is positioned where the tailgate handle is, for access to the handle. In some embodiments, the slit 130 includes a zipper or other closing mechanism. Although FIG. 5 shows the tailgate cover 100, any of the other tailgate covers 200, 300, 400 would appear similar. Furthermore, although the slit 130 is only shown on the tailgate cover 100, the slit 130 is able to be included on any of the other tailgate covers 200, 300, 400.

Figure 6:
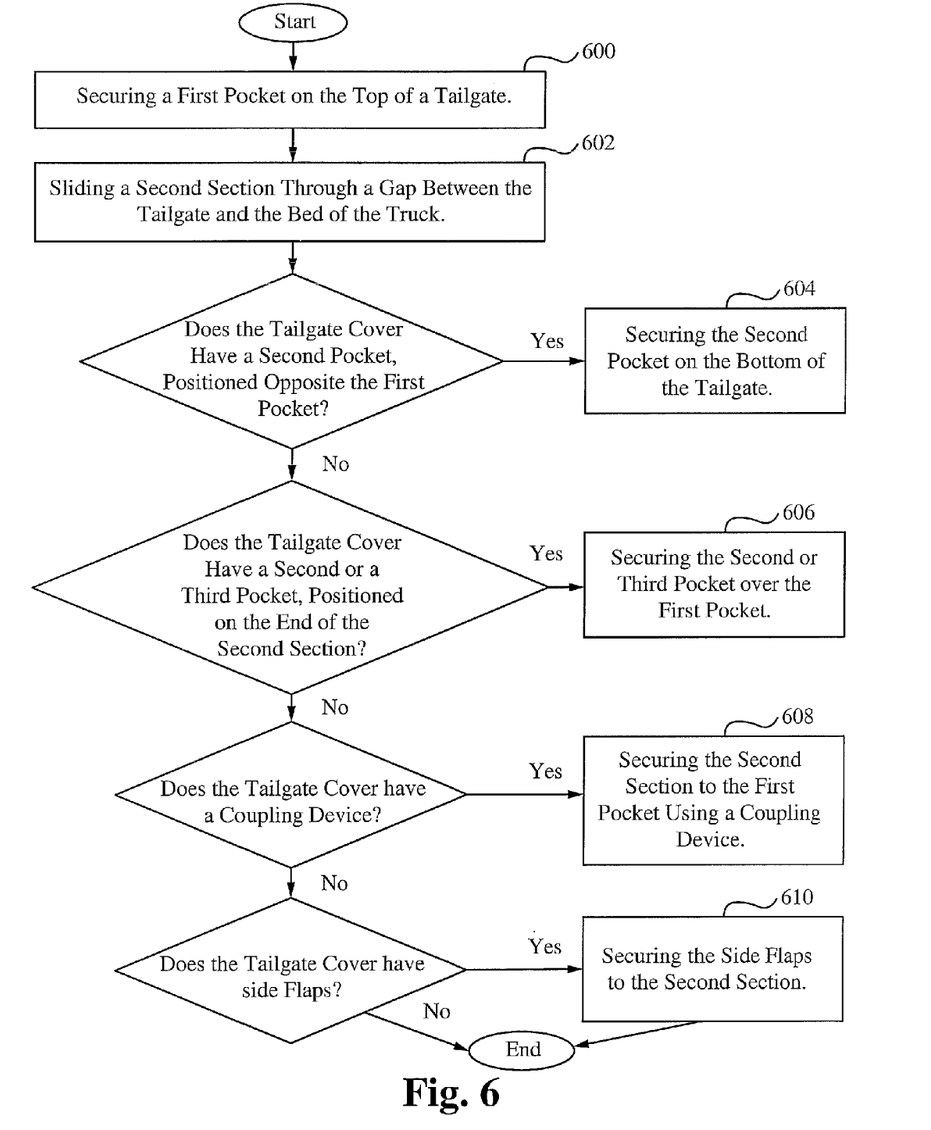
FIG. 6 illustrates a flowchart of a method of securing a tailgate cover on a tailgate in accordance with the present invention.

FIG. 6 illustrates a flowchart of a method of securing a tailgate cover on a tailgate. In the step 600, a first pocket is secured on the top of the tailgate. As described above, the first pocket is secured by simply stretching the pocket over the top of the tailgate and allowing the contraction of the stretchable material to securely hold the pocket in place. In the step 602, a second section of the tailgate cover is slid through a gap between the tailgate and the bed of the truck. In some embodiments, the second section and a second or third pocket are slid through the gap. In some embodiments, a feeder strip is used to help slide/pull the tailgate cover through the gap. In some embodiments, the order of the steps 600 and 602 is reversed. If the tailgate cover has a second pocket positioned opposite the first pocket on the first section, then in the step 604, the second pocket is secured on the bottom of the tailgate. If the tailgate cover has a second or a third pocket positioned on the end of the second section, then in the step 606, the second or third pocket is secured over the first pocket. If the tailgate cover has a coupling device for coupling the second section to the first pocket, then in the step 608, the second section is secured to the pocket using the coupling device. If the tailgate cover has at least one side flap, then in the step 610, the side flap(s) are secured to the second section. Once all of the pockets, coupling devices and/or side flaps are secured, the tailgate cover is secured to the tailgate and the first section is able to be displayed on the back of the truck on the tailgate.

Figure 7:
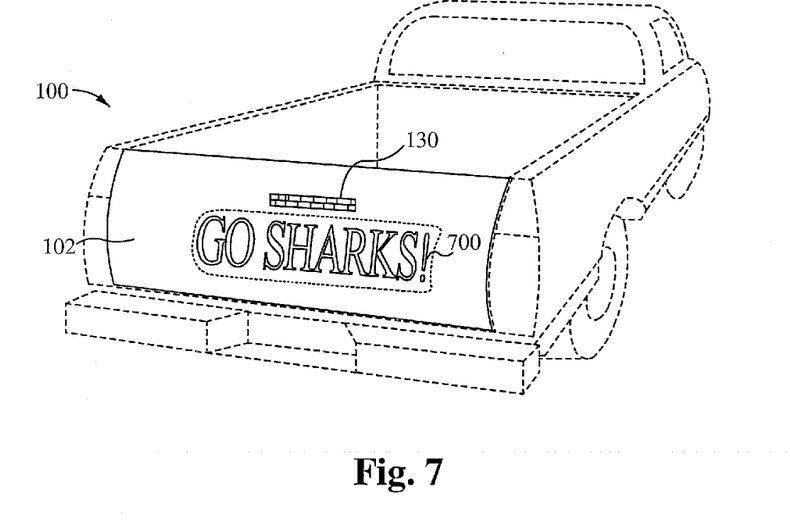
FIG. 7 illustrates a front view of the tailgate cover secured on a tailgate of a truck in accordance with the present invention.

FIG. 7 illustrates a front view of the tailgate cover 100 secured in place. With the tailgate cover 100 secured in place, the first section 102 with a stitched label 700 is visible to those behind the truck. In some embodiments, a slit 130 is included in the first section 102. The slit 130 is positioned where the tailgate handle is, for access to the handle. In some embodiments, the slit 130 includes a zipper or other closing mechanism. Although FIG. 7 shows the tailgate cover 100, any of the other tailgate covers 200, 300, 400 would appear similar.

To utilize the tailgate cover, a user secures the tailgate cover on the tailgate of a vehicle. The method of securing the tailgate cover partially depends on the configuration of the tailgate cover. For some trucks, the tailgate must be opened to start the process and closed to finish the process. A first pocket is secured on the top of the tailgate by stretching the pocket to cover the top of the tailgate. The stretched pocket then contracts on the top of the tailgate and is secured in place by the inward pressure. A second section of the tailgate cover is slid through a gap between the tailgate and the bed of the truck. In some embodiments, a second or third pocket is also slid through the gap. In embodiments with a second pocket opposite the first pocket, the second pocket is secured at the bottom of the tailgate in the same way as the first pocket. In embodiments with a second pocket or a third pocket at the end of the second section, the second or third pocket is stretched over the first pocket at the top of the tailgate. When securing the pocket at the bottom of the tailgate the first section is stretched which further applies a force to keep the pockets on. Similarly, when securing the additional pocket at the top of the tailgate, the second section is stretched to apply more force to keep the pockets on. In embodiments with a coupling device for coupling the second section to the first pocket, the second section is pulled towards the first pocket and the coupling device is secured together. For example, if the coupling device is a hook and loop fabric, such as Velcro®, the hook section is pushed together with the loop section. In embodiments with side straps, the side straps are coupled to the second section around the sides of the tailgate. Securing the tailgate cover is easily done with little effort and few parts. Removal of the tailgate cover is similarly easy, simply by reversing the steps of securing by undoing the coupling device and/or side straps if included, pulling off the pockets and removing the second section through the gap between the tailgate and the bed.

In operation, the tailgate cover protects the tailgate and displays a team logo, advertisement or other graphics and/or text. The one or more pockets and stretchable material ensure a secure fit on the tailgate. Furthermore, additional coupling devices, side straps and the safety cord also help maintain a safe and secure fit of the tailgate cover on the tailgate.

The stretchable material provides several advantages over prior implementations. The stretchable material provides a very secure fit on the tailgate. The stretchable material is able to be a solid color on which text and/or graphics are then printed separately (e.g. by silkscreening) or a separate label is able to be stitched, sewn, glued or otherwise attached to the stretchable material. For example, if a purchaser of the tailgate cover chooses to purchase a blank tailgate cover and then print or attach his company logo on the cover, he is able to do so. The stretchable material is easily washed, for example, by washing machine. Any other means of placing text and/or graphics on the tailgate cover is possible as well.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

The invention claimed is:

1. A tailgate cover for the tailgate of a vehicle, comprising:
   a. a first section;
   b. a second section, wherein the first section is on an outer side of the tailgate for viewing and the second section is slid through a gap between the tailgate and a bed of the vehicle such that the second section is on an inner side of the tailgate within the bed area of the vehicle;
   c. a first pocket that fits over the top of the tailgate, wherein first pocket is coupled to or is an extension of the first section; and
   d. a second pocket.

2. The tailgate cover of claim 1, wherein the second pocket is coupled to or is an extension of the second section and fits on the bottom of the tailgate.

3. The tailgate cover of claim 2, wherein on each of the first section and the second section and/or the first pocket is a coupling device for securing the tailgate cover on the tailgate.

4. The tailgate cover of claim 1, wherein the second pocket is coupled to or is an extension of the second section and sits on top of or underneath the first pocket at the top of the tailgate.

5. The tailgate cover of claim 1, further comprising a third pocket, wherein the second pocket fits over the bottom of the tailgate and the third pocket fits on top of or underneath the first pocket at the top of the tailgate and further, wherein the second pocket is coupled to or is an extension of the first section at the opposite end of the first section from the first pocket and the third pocket is coupled to or is an extension of the second section.

6. The tailgate cover of claim 1, wherein the tailgate cover is stretchable or at least includes a stretchable portion.

7. The tailgate cover of claim 1, wherein the first section displays a team logo, advertisement or other graphics and/or text.

8. The tailgate cover of claim 7, wherein the display is placed on the tailgate cover by one or more of sewing, printing, adhesive and etching.

9. The tailgate cover of claim 1, further comprising a slit included in the first section positioned where the tailgate handle is on the tailgate, for access to the handle.

10. The tailgate cover of claim 1, configured to fit on the tailgate of a truck.

11. The tailgate cover of claim 1, further comprising a coupling device which is attached to the first and the second section of the tailgate cover and the second section is pulled towards the pocket, wherein the two sections are secured by the coupling device.

12. The tailgate cover of claim 11, wherein the coupling device is one or more of a hook and loop fastening system, a zipper, grommets, rope through loops, hooks through holes, magnets, straps, clips, belts, snaps, bars, sheaths or any combination thereof.

13. The tailgate cover of claim 1, further comprising flaps which help maintain a secure fit of the tailgate cover on the tailgate.

14. The tailgate cover of claim 1, further comprising a safety cable with a fastener coupled to the tailgate cover that is used to couple the tailgate cover to a part of the vehicle.

15. The tailgate cover of claim 14, wherein the fastener is a lock such that the safety cable is able to prevent others from stealing the tailgate cover by locking the tailgate cover to the vehicle.

16. The tailgate cover of claim 14, wherein the safety cable is one or more of rope, bungee cord, wire cabling or plastic cabling.

* * * * *